J. Wright.

Mashing App's.

N° 8,183.

Patented Jun. 24, 1851.

UNITED STATES PATENT OFFICE.

JOSEPH WRIGHT, OF WATERLOO, NEW YORK.

MASHING-TUB.

Specification of Letters Patent No. 8,183, dated June 24, 1851.

*To all whom it may concern:*

Be it known that I, JOSEPH WRIGHT, of Waterloo, in the county of Seneca and State of New York, have invented new and useful improvements in the apparatus for forming the mash from raw or prepared meal or grain and for mixing, cooking, and cooling the same for the purposes of distilling and brewing; and I do hereby declare that the following is a full, clear, and exact description of the same, reference being had to the accompanying drawings, forming part of this specification, in which—

Figure 1:
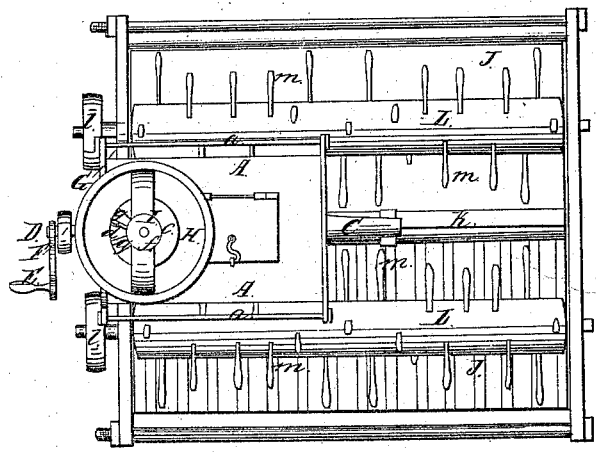
Figure 2:
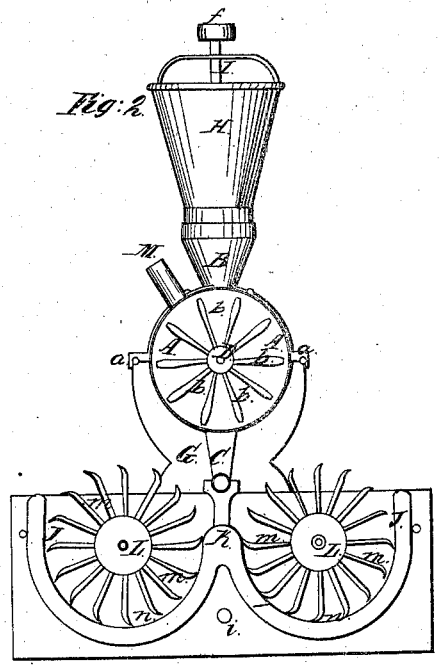
Figure 3:
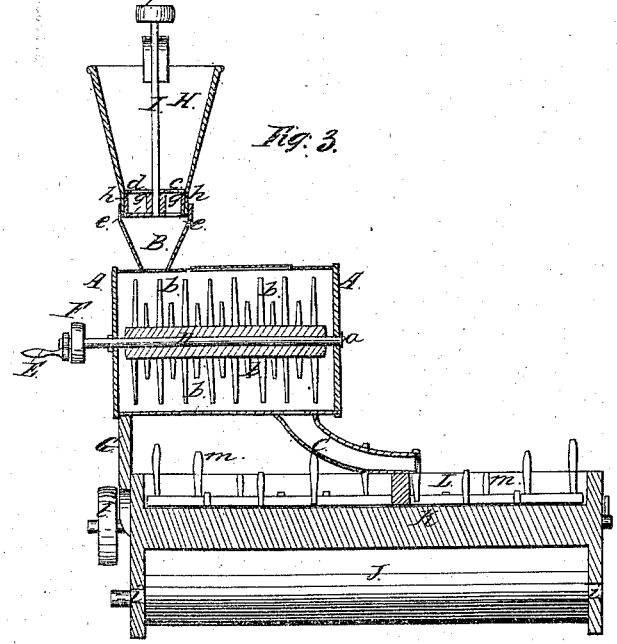
Figure 5:
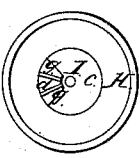
Figure 4:
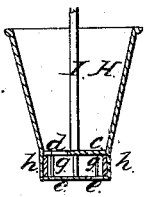
Figure 6:
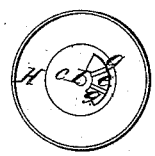

Figure 1, is a plan. Fig. 2, is an end elevation with the outer covers, or ends removed to exhibit more fully the interior beaters. Fig. 3, is a longitudinal section. Fig. 4, is a part sectional elevation of the hopper and its working attachments for feeding in the meal or grain, and Fig. 5, is a regular plan, and Fig. 6, an inverted plan (or view from underneath) of the same.

The same letters of reference denote similar parts throughout each of the several figures.

The nature of my invention consists in the combined use of a closed cylinder, in which is a revolving shaft, having beaters, and moving at a quick velocity, the meal or grain being admitted by a self regulating hopper, in proper proportions to the supply of heated water, and uniformly scalded and mashed in small quantities; the "mash," thus rapidly formed, continually passing off into a cooler having a large metallic, or other, cooling surface, and which may be supplied with a current of cold air, or water, it being provided with revolving beaters for stirring up the mash against the air.

To enable others skilled in the art to make and use my invention, I will proceed to describe its construction and operation.

A, A, is the stationary mashing cylinder having a feeding funnel B, and delivery outlet pipe C; it is shown horizontal, but may be set at any suitable position or angle. $a, a,$ are rods for bracing the cylinder, one end or cover of which, is made removable, by unfastening the nuts screwing on the ends of the rod $a, a$.

D, is the mashing staff or shaft, having projecting beaters $b, b, b, b,$ of any suitable number and shape, and arranged around the shaft D, in rows, or in any regular, or irregular, manner. The cylinder A, A, may also have beaters projecting from its interior, between which the revolving beaters $b, b, b, b,$ might work or pass. The shaft D, and its beaters $b, b, b, b,$ are set in rapid motion by handle E, or pulley F, driven by steam or other power. The cylinder A, A, rests on an upright G, or may be otherwise supported to keep it stationary.

H, is a hopper, through which the grain or meal is fed, it is fitted with two plates $c, c,$ at its bottom, situated a short distance apart, and having radial openings $d, e,$ the one opening $d,$ in the top plate $c,$ and the opening $e,$ in the bottom plate $c,$ being positioned on opposite sides of the center, or one, on the left, and the other on the right hand side, of the hopper H.

I, is an upright shaft driven by pulley $f,$ the shaft I, works through the plates $c, c,$ and has arms $g, g,$ of any required number, branching from it, bound by a ring $h, h,$ which together with the arms $g, g,$ work between the plates $c, c,$ the spaces formed by the arms $g, g,$ constituting so many buckets, into which the meal or grain passes from the hopper through the opening $d,$ and which is delivered into the funnel B, during the revolving motion of the shaft I. through the opening $e$.

M, (Fig. 2,) is a pipe for conducting heated water into the cylinder A, A, to form the mash.

J, J, is a cooler, into which the mash is run from the outlet C; it may be made for or lined with metal, and be of any suitable size or shape, it may consist of one, or more, say, two curved chambers as shown in the drawing having a bridge K, and having its interior surface made either plain, or with ribs, or other projections, and may be seated in another vessel, containing, or be surrounded by, water, which may be admitted through the openings $i, i,$ or be made to circulate around the cooler J, J, the construction and form of which, if of metal, being so arranged as to present a large metallic cooling surface in proportion to the quantity of " mash " it contains.

L, L, are barrels revolving in opposite directions and driven by the pulleys $l, l,$ The barrels L, L, may be made with a hollow passage through their center (as shown in Fig. 2,) for the flow of cold water to aid in cooling the mash.

$m, m, m, m,$ are projecting pins, or beaters, attached to the barrels L, L, they may be arranged around the barrels in any suitable way, and be of any proper size or shape, and made either hollow or solid. Any number of barrels L, L, may be used, or one only, if preferred, according to the size and shape of the cooler J, J.

n, n, (Fig. 2) are outlets for the mash when sufficiently cooled, and which, while the mash is being made, or cooled, are shut up by plugs.

The operation is as follows. The meal or grain being fed into the hopper H, and the several pulleys f, F, l, l, being set in motion, the buckets formed by the arms g, g, attached to the shaft I, receive a portion of the meal or grain through the opening d, in the top plate c, delivering the same through the opening e, into the funnel B, and hence to the cylinder A, A; heated water being simultaneously introduced, in a regulated proportion, through the pipe M; the heated water scalding the meal or grain, which by the rapid motion of the beaters b, b, b, b, is quickly mashed, and mixed up or incorporated, as it were, with the water; the mash, thus formed, continually passing off through the outlet C, into the cooler J, J, where it is stirred, and thrown up against the air, by the revolving beaters m, m, m, m, for the purpose of more rapidly and effectually cooling the mash, in addition to the arrangements, already described, for that purpose, in the form of the cooler J, J, passages through the barrels L, L, and current, or surrounding vessel, of water. It will be seen that the delivery of meal or grain to the cylinder A A, is regulated, in its proportion, to the speed of the masher or beaters b, b, b, b; for should the velocity of the prime mover be changed, the several pulleys F, f, l, l, would each be proportionally affected, and the buckets or spaces formed by the arms g, g, receive and deliver, only so much meal or grain, as the speed of the beaters b, b, b, b, are capable of mashing; the supply of heated water forming the mash, being also proportionally regulated.

The following are a few of the advantages of my invention over the ordinary process of mashing. The meal or grain being mixed in small quantities within a closed cylinder as described, the mash is more thoroughly perfected and mixed, than in the ordinary large open mash tun; the meal or grain being thoroughly incorporated with the water, scalded and mashed; lumps in the mash are less liable to form when thus mixed, and a lower temperature of water may be used for forming the mash, but producing an equal, and uniform, scald, as the quantity operated on, at the same time, is but small, hence, but little loss by radiation of heat occurs; and consequently, not only is the virtue of the meal or grain preserved, but the injury sustained by the use of a high temperature of water, as in the ordinary mash tun, by overscalding and under scalding parts, is avoided. A smaller prime mover will suffice to form the mash. Room is considerably economized and the apparatus more easily kept sweet and clean. A quick and effectual condensation is procured and when mashing for the purposes of distilling corn meal without the usual mixture of English or small grain, will be found, by this arrangement, to produce good and abundant spirits, as the mash by this means is better mixed, scalded and cooked whereby raw meal may be used; and for the purposes of brewing the prepared grain, or malt, is similarly operated on.

What I claim as my invention and desire to secure by Letters Patent is

1. The employment of buckets formed by the revolving arms g, g, working within the hopper H, for delivering the grain through suitable openings d, e, into, and operating in combination with the mashing cylinder A, A, having an outlet C, (or outlets) for supplying the cooler J, J, substantially as shown and described.

2. The use of a mashing cylinder A, A, having beaters within it and operating in combination with a cooler J, J, carrying any number of barrels or shafts L, L, fitted with projecting pins m, m, m, m, essentially as shown and described, for the purposes set forth.

In testimony whereof I have hereunto signed my name before two witnesses.

JOSEPH WRIGHT.

Witnesses:
HULING G. HADLEY,
CHARLES B. HUTCHEN.